United States Patent
Padmanaban et al.

(10) Patent No.: US 11,138,426 B2
(45) Date of Patent: Oct. 5, 2021

(54) TEMPLATE MATCHING, RULES BUILDING AND TOKEN EXTRACTION

(71) Applicant: SAP SE, Walldorf (DE)

(72) Inventors: Venkatakrishnan Padmanaban, St. Louis Park, MN (US); Sabirhusain Patel, St. Louis Park, MN (US); Mahalingam Vanniappan, St. Louis Park, MN (US); Bing Liu, St. Louis Park, MN (US); Nishant Pounikar, St. Louis Park, MN (US); Daniel Bednarski, St. Louis Park, MN (US); Andrew Dotson, St. Louis Park, MN (US)

(73) Assignee: SAP SE, Walldorf (DE)

( * ) Notice: Subject to any disclaimer, the term of this patent is extended or adjusted under 35 U.S.C. 154(b) by 41 days.

(21) Appl. No.: 16/111,339

(22) Filed: Aug. 24, 2018

(65) Prior Publication Data
US 2020/0065576 A1 Feb. 27, 2020

(51) Int. Cl.
*G06K 9/00* (2006.01)

(52) U.S. Cl.
CPC ..... *G06K 9/00483* (2013.01); *G06K 9/00449* (2013.01); *G06K 9/00463* (2013.01)

(58) Field of Classification Search
CPC ........... G06K 9/00449; G06K 2209/27; G06K 9/00456; G06K 9/00483; G06K 9/2054; G06K 9/6256; G06F 16/00; G06F 16/22; G06F 16/93; G06F 16/951; G06F 17/243; G06F 17/248; G06F 17/2705; G06Q 10/00; G06Q 10/02; G06Q 10/087; G06Q 10/10; G06Q 10/1093; G06Q 20/203; G06Q 40/02
See application file for complete search history.

(56) References Cited

U.S. PATENT DOCUMENTS

| | | | |
|---|---|---|---|
| 9,129,276 B1 * | 9/2015 | Fasoli | G06Q 10/087 |
| 2010/0014784 A1 * | 1/2010 | Silverbrook | G06K 9/228 382/313 |
| 2014/0348396 A1 * | 11/2014 | Laaser | G06K 9/00442 382/113 |
| 2015/0019436 A1 * | 1/2015 | Dalal | G06Q 20/042 705/45 |
| 2015/0039707 A1 * | 2/2015 | Gregg | G06F 16/93 709/206 |
| 2017/0140048 A1 * | 5/2017 | Wang | G06Q 10/02 |
| 2018/0114060 A1 * | 4/2018 | Lozano | G06Q 10/10 |

(Continued)

*Primary Examiner* — Golam Sorowar
(74) *Attorney, Agent, or Firm* — Buckley, Maschoff & Talwalkar LLC

(57) ABSTRACT

According to some embodiments, systems and methods are provided, comprising receiving a document at a template module; determining a pair of pixel coordinates for one or more data entry fields in the received document; determining whether the received document matches a stored template based on the determined pair of pixel coordinates; generating a first template when the received document does not match the stored template; applying one or more rules associated with one of the stored template and the first template to the received document; extracting one or more data elements from the received document based on the application of the one or more rules; and returning the extracted one or more data elements. Numerous other aspects are provided.

17 Claims, 7 Drawing Sheets

(56) References Cited

U.S. PATENT DOCUMENTS

| | | | |
|---|---|---|---|
| 2019/0028731 A1* | 1/2019 | Chuang | H04N 19/105 |
| 2019/0095968 A1* | 3/2019 | Ceribelli | G06Q 30/0609 |
| 2019/0286900 A1* | 9/2019 | Pepe, Jr. | G06T 7/11 |

* cited by examiner

| TOP | LEFT | BOTTOM | RIGHT | TEXT VALUE |
|---|---|---|---|---|
| 100 | 20 | 600 | 800 | INV1234 |
| 100 | 40 | 600 | 700 | 100.23 |
| 200 | 40 | 500 | 700 | 6.23 |

TEMPLATE MATCHING, RULES BUILDING AND TOKEN EXTRACTION

BACKGROUND

Organizations often process many documents during the course of standard operations. Document processing tasks may include entering data from a document into a processing system and validating the data of the documents before the document may be further processed. A considerable amount of manual hours (e.g., a few hours to a few days) may be required in order to enter, validate and verify the data on the documents, depending upon the volume and complexity of the documents.

Organizations may typically try to speed up document processing by creating a template of the document to automatically extract the data therefrom. However, the creation of the conventional template is manually-driven, requiring a user to manually map a location of each data field in the document to the template. Additionally, these conventional templates do not extract the data with suitable accuracy.

Systems and methods are desired which support efficient template generation for accurate data extraction.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Organizations often process many documents during the course of standard operations. Some of the tedious tasks included with document processing may be to enter data from a document to a processing system and to validate the data on the documents before the document may be further processed. For example, in the area of invoice processing and accounts payable (AP) automation, tedious tasks include validating an incoming invoice document and entering the data into the AP system as it was received. In order to validate/verify the incoming invoice data, it may take a few hours to a few days to enter all of the invoice data with 100% accuracy for a given period depending upon the volume and complexity of the invoices.

Conventional applications try to remove this manual effort by extracting the values automatically from the invoices, but these conventional approaches may not provide suitable accuracy.

As used herein the term "accuracy" means the data received as an invoice should be exactly entered into the AP system that a company uses. As used herein, "invoice capture process" may refer to the process of entering the data from the invoice to the AP system.

It is noted that while invoice processing and AP automation are used as an example throughout the specification, this is a non-exhaustive example, and one or more embodiments may apply to any suitable document processing.

Figure 1:
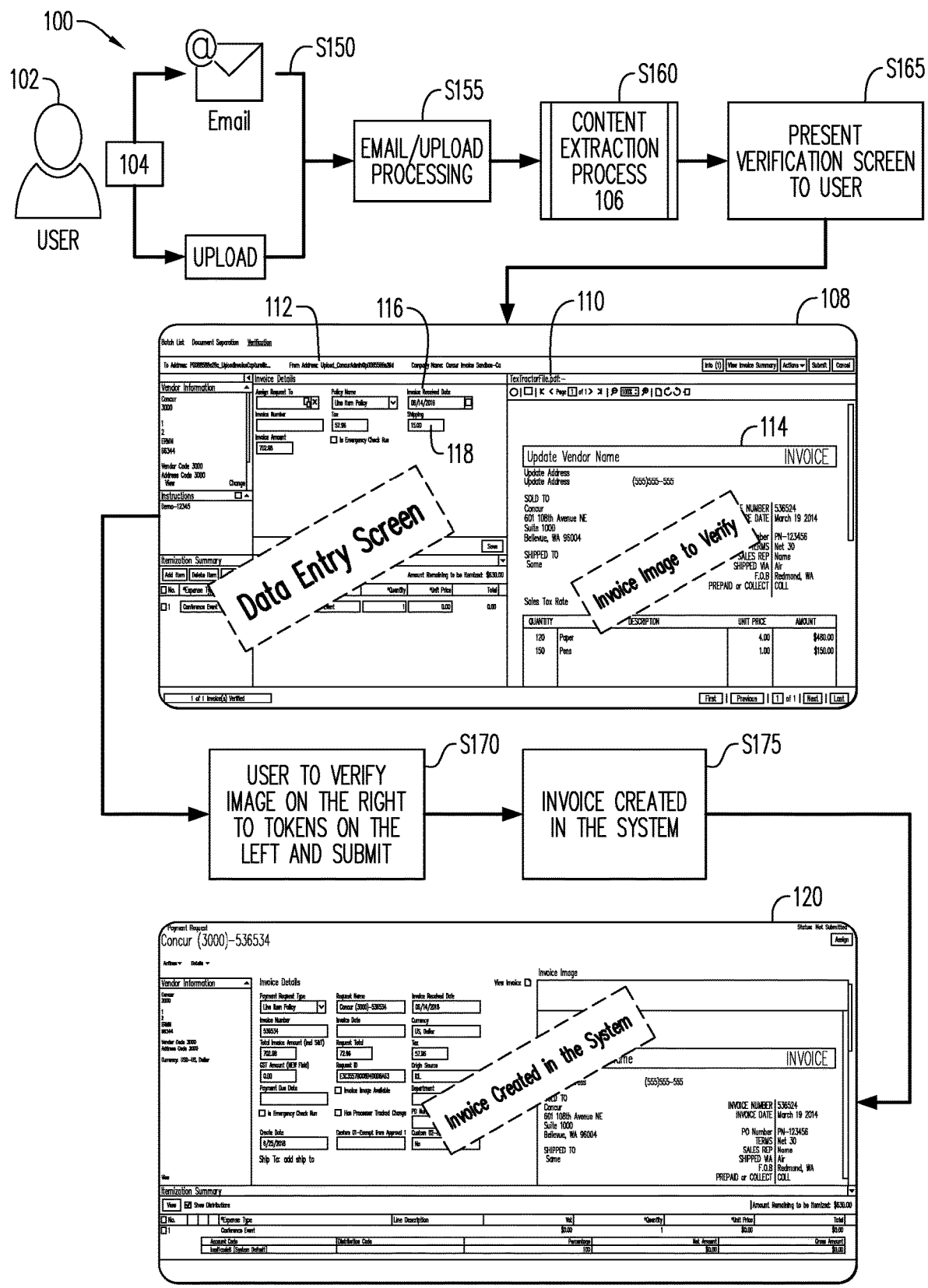
FIG. 1 is a flow diagram of a process according to the prior art.

Turning to FIG. 1, an example of a prior art invoice capture process 100 is provided. Initially, in a conventional process, a user 102 receives an invoice 104 via email or uploading at S150. The invoice is processed at S155. The invoice processing includes various application level processing like receiving the invoice document via Email or from Upload, detecting if it is a valid invoice (for example, it is in a right size and not a logo), and making sure that it is readable and not password protected, and then converting the incoming document to a PDF document. Then, a content extraction process 106 is executed at S160 to extract one or more values from the invoice 102. The typical content extraction process may take between one to five minutes, depending on the complexity of the document. It may take more or less time. Next, the extracted values are presented in a verification screen 108 to a user in S165. The verification screen 108 may include a first portion 110 and a second portion 112. The first portion 110 may include an image of the invoice ("invoice image") 114. The second portion 112 may include a data entry screen 116 with one or more data entry fields 118. Each data entry field 118 may include a value from the invoice 114, another value, or no value. Then, in S170, the user 102 may verify that the data entry fields 118 include the correct data values per the invoice image 114. The user 102 may change any of the data values in the data entry fields 118. The user 102 may then submit the data entry screen 116 and an invoice is created in the system ("system invoice") 120 in S175.

As described above, conventional methods to create a content extraction process may be very time consuming, and manually-driven. For example, a user may have to manually determine every location where data may be extracted from the document and provide these locations in a map for the extraction process. Conventional systems may also search for an anchor word to determine which values to extract, which may make the conventional systems difficult to scale for users that use different words. Additionally, after the data has been extracted, a lot of time is spent verifying the extracted data is accurate, and often times, the accuracy is only about 70%.

Many documents generated today by organizations may be generated by machines (e.g., computers.) When the document, such as an invoice, is generated through machines, the structure of the document may be the same between documents. For example, when Big Box Depot sends an invoice to many of its customers, it may be very likely that the structure of the invoice may be the same, but the content (e.g., values) may be different.

One or more embodiments provide an automatic template generation and extraction module ("template module") that may determine whether a template corresponding to a document exists to extract one or more data elements from the document. When the template exists, the template module may apply one or more rules associated with the template to extract the data elements. When the template does not exist, the template module may generate a new template. The template module may also, in one or more embodiments, update a template by generating one or more updated rules.

In one or more embodiments, the template module may analyze a document to determine a position of static and dynamic content in the document. In one or more embodiments, the position of the content in the document may be denoted by pixels locations. Any point on the document, such as the beginning of the data-entry field, for example, may be uniquely identified based on four pixel locations— top, bottom, left and right. After determining the position of the content in the document, the template module may determine whether those positions match, or substantially match, the content positions of a stored template. As used herein, a "template" may refer to a set of content positions (top, bottom, left, right) which may provide a picture about the structure of the document. As used herein, a document is said to "match" a template when 50% of the content positions are the same. When a template match is not available, the template module may generate a new template. In one or more embodiments, after the template is retrieved or generated, one or more rules associated with the template may be applied to the document to extract the data values from the document.

FIGS. 2-6 include flow diagrams of a process 200 (FIG. 2) and a process 300 (FIG. 3) for extracting data elements according to some embodiments. Processes 200/300 may be executed by application server 730 according to some embodiments. In one or more embodiments, the application server 730 may be conditioned to perform the processes 200/300, such that a processor 810 (FIG. 8) of the server 730 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 201/600 (FIGS. 2 and 6) may be presented on any type of display apparatus (e.g., desktop monitor, smartphone display, tablet display) provided by any type of device (e.g., desktop system, smartphone, tablet computer). One or more embodiments may include a UI renderer (not shown) which is executed to provide user interfaces 201/600 and may comprise a Web Browser, a standalone application, or any other application. Embodiments are not limited to user interfaces 201/600 of FIGS. 2 and 6.

Initially, at S250, a document 202 is received at a document processing system 206. In one or more embodiment, the document may be received via email, uploading, or any other suitable document transmission process. As a non-exhaustive example described herein, the document 202 is an invoice, but any suitable document may be used. The document 202 may be in a variety of document formats, including but not limited to, PDF, Images, Tiff, Office docs, etc. In one or more embodiments, a user 204 sends the document 202 to the document processing system 206. The document processing system 206 may include a template generation and extraction module ("template module") 208 to receive the document 202. In S255, the template module 208 is executed. In one or more embodiments, execution of the template module 208 includes determining whether the received document 202 matches a stored template; creating a template if there is no match; applying rules associated with the stored or new template to the received document to extract one or more data element values from the received document; and returning the extracted values to at least one of a user interface associated with a data capture application of the document processing system 206 or another application or system. In one or more embodiments, in S260, the data capture application provides the extraction result data values in data entry fields 210 in a user interface display 201. In one or more embodiments, an image 212 of the received document 202 may be included on the user interface display 201.

In the non-exhaustive examples described herein, the document is an invoice, the document processing system is an invoice processing system, and the data capture application is an invoice capture application, but any other suitable documents and document processing applications and systems may be used. As compared to the typical invoice capture processes described, for example, with respect to FIG. 1, one or more embodiments provide for using the Template matching and Extraction process, to provide a more accurate system in terms of extracting fields from the invoice, and a faster extraction speed, which will improve productivity. In one or more embodiments, based on the extraction accuracy and confidence level, the user verification screen may be bypassed, which is a direct human effort/cost savings. It is noted that when one company sends a certain type of Invoice, and if another company sends the same invoice for the first time, the extraction may be 100% accurate since the system would have already learned the Template/Ground truth/Rules. The inventors further note that one or more embodiments may provide for language agnosticism (e.g., since one or more embodiments use Pixel location matching, language is not a big barrier). For example, even double byte invoices could be easily extracted in this process without any additional language training to the system.

Figure 2:
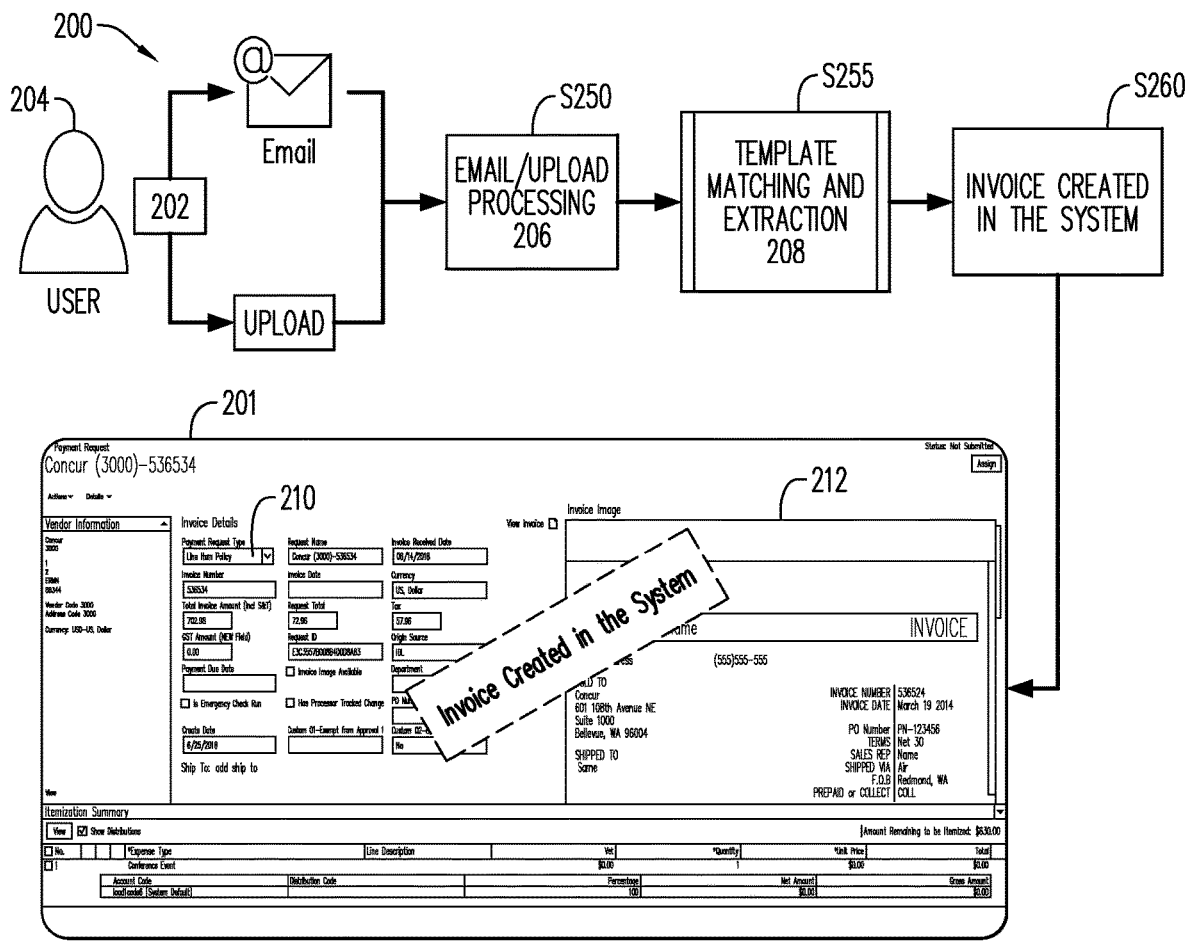
FIG. 2 is a flow diagram of a process according to some embodiments.
Figure 3:
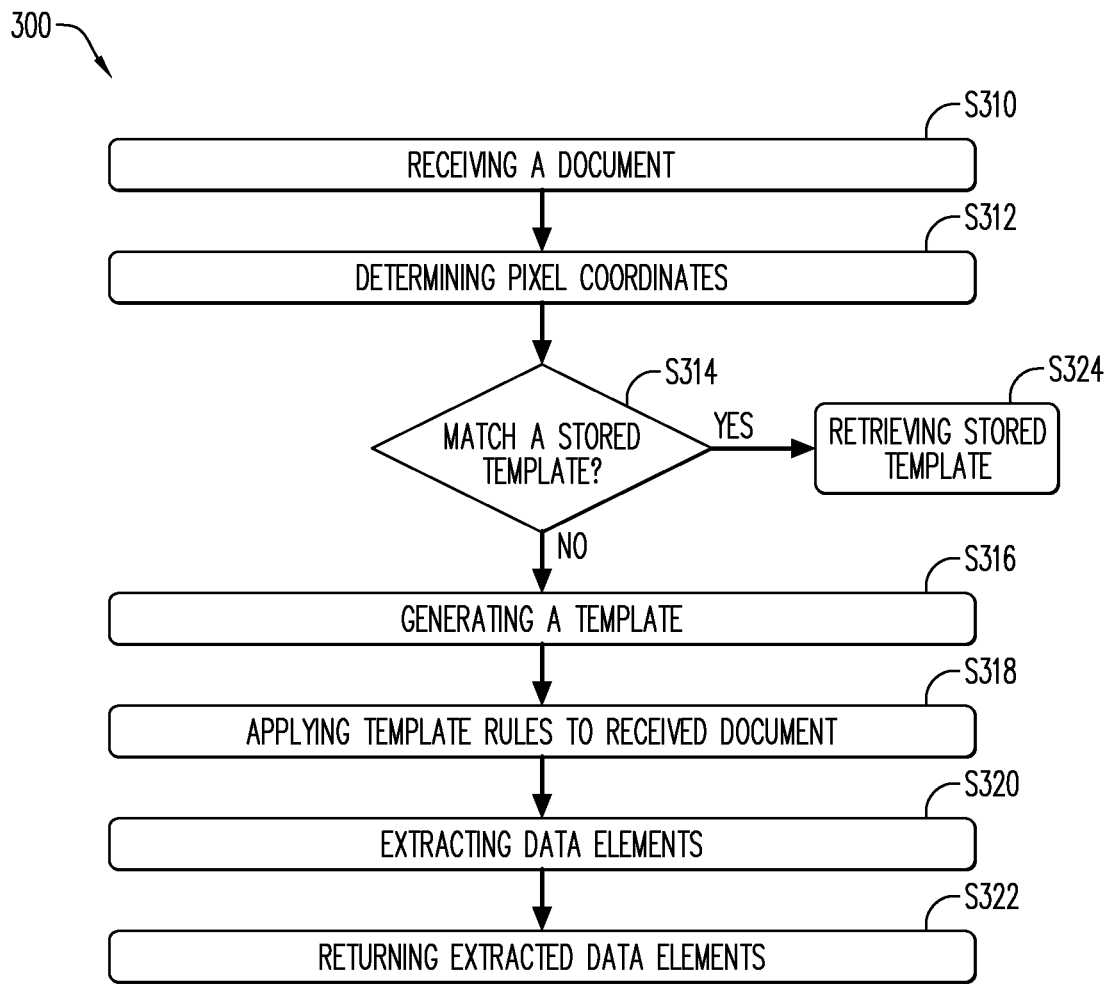
FIG. 3 is a flow diagram of a process according to some embodiments.
Figure 4:
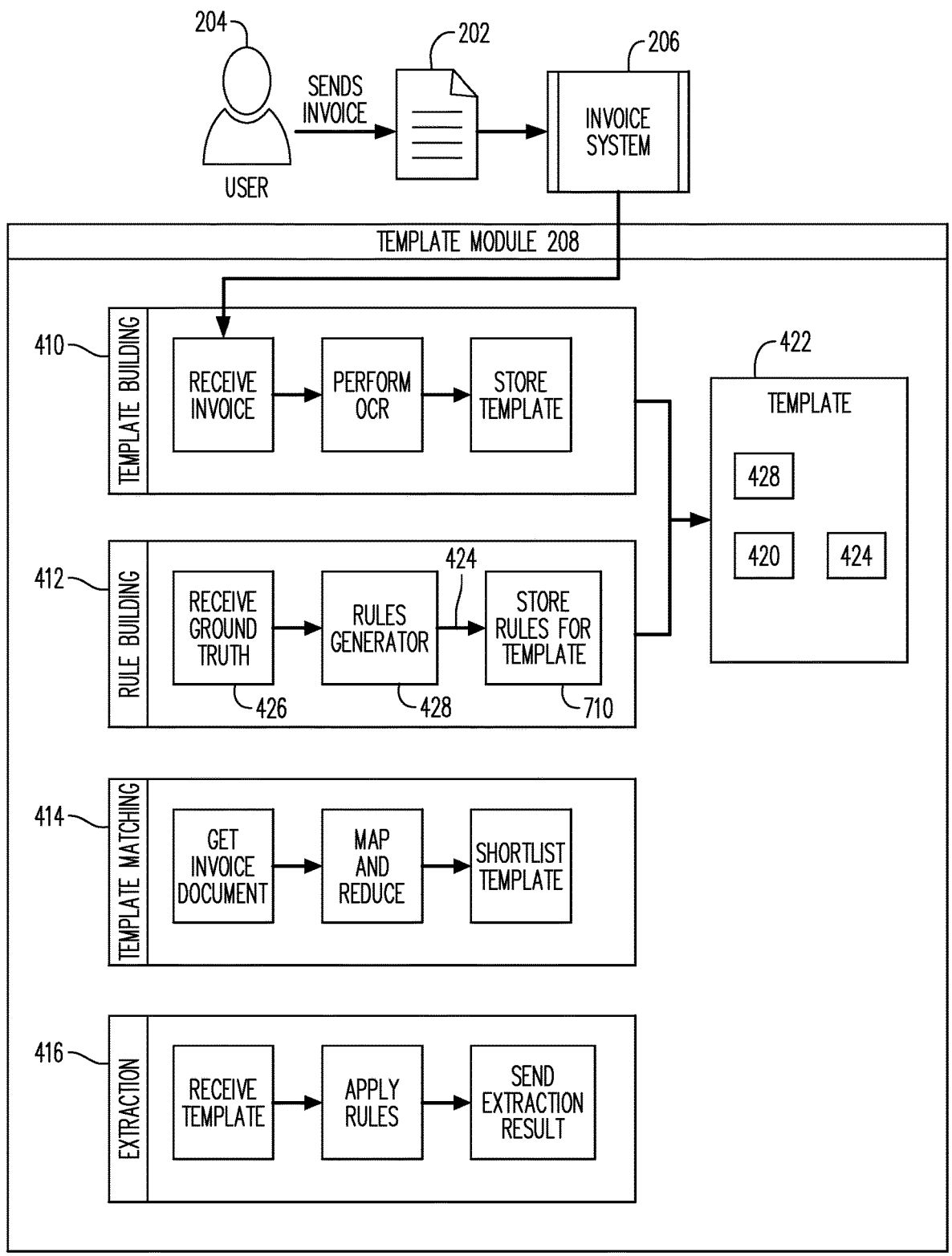
FIG. 4 is an architecture flow diagram according to some embodiments.

The process 300 described in FIG. 3 expands on the process 200 described with respect to FIG. 2.

Initially, at S310, a document 202 is received, as in S250. In one or more embodiments a user 204 sends the document 202 to the document processing system 206, such as an invoice system 206. In one or more embodiments, the document processing system 206 may include the template generation and extraction module ("template module") 208 to receive the document 202. The template module 208 may include a template building module 410, a rule building module 412, a template matching module 414 and an extraction module 416.

Then in S312, pixel coordinates for static and dynamic content on the received document 202 are determined. As used herein, "static content" may refer to labels on the Invoice document, (e.g., Invoice Number, Invoice Date etc.); and "dynamic content" may refer to actual values corresponding to the labels. In one or more embodiments, the template building module 410 may receive the document 202, and may execute an optical character recognition (OCR) process 418 on the document 202 to determine the pixel coordinates. The OCR process 418 may convert images of typed, handwritten or printed text in the document into machine-encoded text, and the machine-encoded text may include coordinate positions of each letter on the page. As is known, a digital image is made up of rows and columns of pixels. A pixel may be identified by a pair of integers giving the column number and row number for the pixel ("coordinates").

Figure 7:
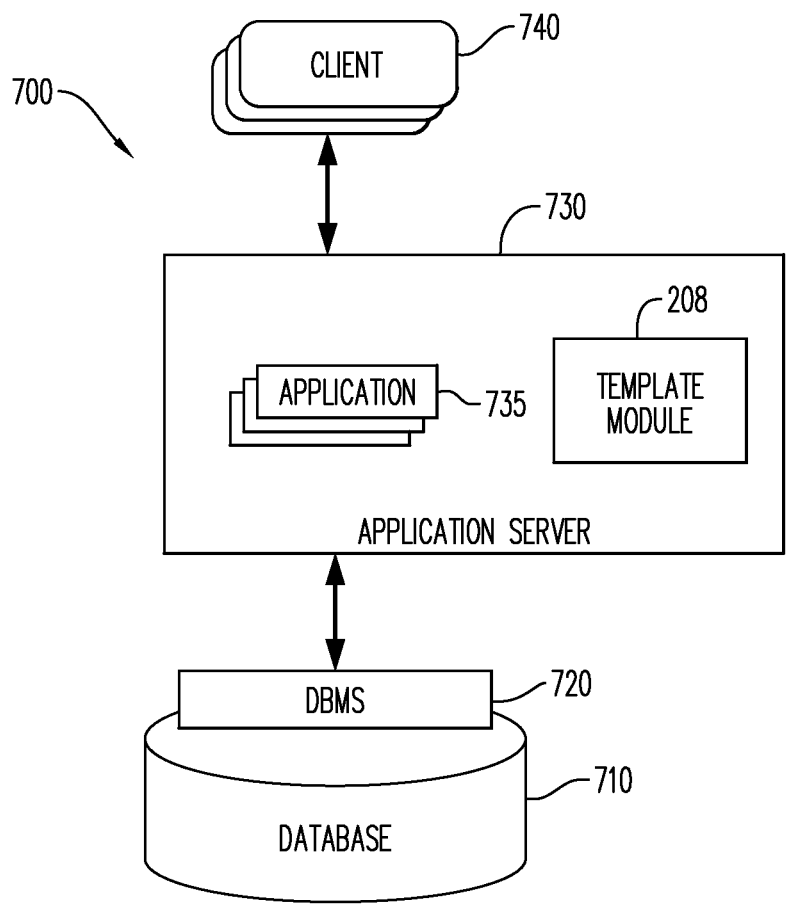
FIG. 7 is a block diagram of a system architecture according to some embodiments.

In one or more embodiments, a location map 420 for a template 422 may be generated by the OCR process 418. As used herein, the template 422 may include the location map 420 and a rules map 424. The location map 420 is a set of element/word locations (top, bottom, left, right), which may provide a picture about the structure of the document. In one or more embodiments, a set of pixel coordinate positions that delineate a data-entry field may be stored in the form of the location map 420 in a data store 710 (FIG. 7). In one or more embodiments, each coordinate position, including non-data-entry fields may be stored in the data store 710. In one or more embodiments, the template 422 may include the position of all the words in a document, irrespective of static or dynamic content.

Figures 5, 6:
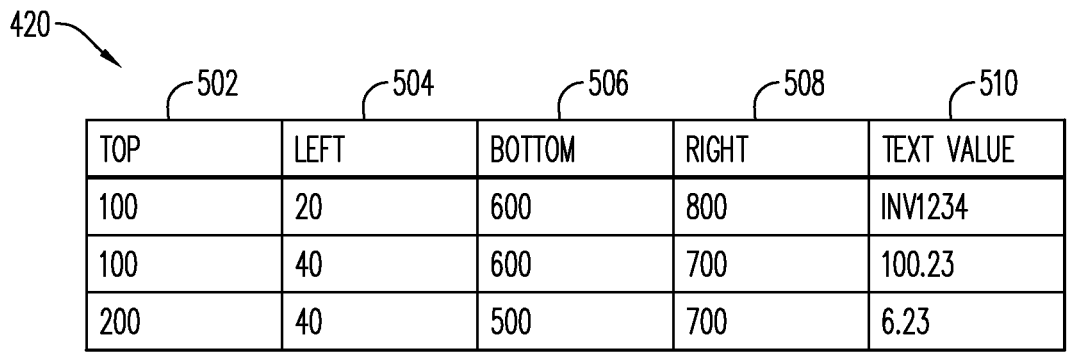
FIG. 5 is a coordinate table according to some embodiments.
FIG. 6 is an outward view of a graphical interface according to some embodiments.

For example, FIG. 5 shows a location map 420 for the document 202. The location map 420 may be stored in a table or any other suitable storage. The location map 420 includes a top pixel position 502, left pixel position 504, bottom pixel position 506, and right pixel position 508. In one or more embodiments, these positions (502, 504, 506 and 508) may provide the coordinate positions for the dimensions of a data-entry field 605 (FIG. 6). For example, the top left corner of the data-entry field may be at 100,20 and the bottom right corner of the data-entry field may be at 600,800. It is noted that coordinates may be used for both static field and dynamic field matching in a template. For extraction, the dynamic field positions may be compared. The location map 420 may also include a data element value 510 located within the data-entry field delineated by the positions. For example, the document may include static content "InvoiceNumber" with a data-entry field adjacent thereto. The data-entry field may be located at 100, 20, 600, 800, and may include the data element value 510 "INV1234".

Turning back to the process 300, at S314 it is determined whether the pixel coordinates determined for the location map 420 for the received document 202 match a location map of a saved template 422 via the template matching module 414. In one or more embodiments, the template matching module 414 may determine the received document 202 matches a saved template 422 when the pixel coordinates in the location map 420 match pixel coordinates in a location map of the saved template 422. It is noted that conventional image matching typically uses a binary process. In a binary process, two images are typically compared using the Dots Per Inch (DPI) matching logic of both the images. Unlike other matching processes, one or more embodiments provide for the comparison of the start position of all the texts on a page and then shortlisting the template.

In one or more embodiments, the template matching module 414 may, starting at a top-left corner of the location map 420, scan gradually towards the right, word by word, and then to the next line, such that the location of each data entry field may be compared to the one or more locations of data entry fields in the location maps of any saved templates 422. In one or more embodiments, the template matching module 414 may determine if a left pixel coordinate of a data entry field in the location map 420 matches the left pixel coordinate of the data entry field in the location map of a saved template 422. In other embodiments, the template matching module 414 may begin the scan at a different position of the location map 420. As the template matching module 414 scans through the pixel locations in the location map 420 and searches the location maps of the saved templates 422 for matches, the number of matches may be reduced. For example, after scanning through a first half of the location map 420, there may only be one saved template 422 that matches the rest of the locations. In one or more embodiments, when a matched threshold of the pixel locations in the location map 420 match those in a saved template 422, the template matching module 414 may consider this a match. For example, when seventy percent of the pixel locations in the location map 420 and the saved template 422 match, the template matching module 414 may consider this a match. Other suitable match thresholds may be used. In one or more embodiments, the match threshold may be configured by a system administrator, application developer, or any other suitable party. In one or more embodiments, the one or more "matched" saved templates 422 may be placed onto a shortlist, and the template matching module 414 may continue to reduce the templates on the shortlist to a single matched template. In one or more embodiments, the single template that remains on the shortlist may have the most matched pixel locations.

When in S314 it is determined the location map 420 does not match a saved template 422, the process 200 proceeds to S316, and a rules map 424 is generated.

In one or more embodiments, the rule building module 412 may include a rules generator 428 to generate the rules map 424. The rule building module 412 may receive a ground truth value 426. In one or more embodiments the ground truth value may be received separately from receipt of the received document. The ground truth value may be received from the user 204 or any other suitable party. As used herein, "ground truth" may refer to the actual verified values filled-in for one or more tokens (e.g., Invoice Number, Invoice Amount, Shipping Amount) in the document 202 by the user when the document 202 was submitted to the invoice system 206. In one or more embodiments, the user 304 may define the data element values they want extracted from the document 202. For example, the user may only confirm, via the ground truth values, the data element values they want extracted. For example, an invoice capture application of the invoice system 206 may present the user 204 with a verification screen. The verification screen may include the received document 202 and a data entry screen, whereby the user 204 may enter in ground truth values 426 for the one or more tokens listed on the data entry screen. As a non-exhaustive example, for an "InvoiceNumber" token, the ground truth value may be "INV1234"; for an "InvoiceAmount" token, the ground truth value may be "100.23"; for a "ShippingAmount" token, the ground truth value may be "6.23." As used herein, the term "token" may refer to a field on the invoice.

In one or more embodiments, the ground truth value 426 may be received from another template or system, such that it may not be received directly from the user 204. As a non-exhaustive example, a same invoice document may be used across multiple clients.

After the ground truth values 426 are received, the rule building module 412 may map the ground truth value 426 to the corresponding value in the received document 202, and then retrieve the pixel location for that corresponding value in the received document 202 to build the rules, where the corresponding values in the received document are the machine-encoded text resulting from the OCR process 418. This mapping may be used by the rules generator 428 to dynamically create the rules map 424. The rules map 424 includes one or more rules. Each rule specifies where to extract a particular value from on the received invoice, so that it may be transferred to a corresponding location in an invoice capture application that is returned to the user 204.

As a non-exhaustive example, the received document 202 is an invoice, and the amount of the invoice is $500. After the user 204 enters $500 as the ground truth, the rule building module determines where (e.g., pixel coordinates) $500 is positioned on the location map 420 created for that received document 202. Then, an invoice amount rule may be built by the rule generator 428 where application of this rule extracts the invoice amount from that particular pixel coordinate.

In one or more embodiments, in addition to pixel location information, each rule may also include additional information to uniquely identify a value. For example, the rule may indicate that the data element value 510 is in a date format, a number format, a currency format, or any other suitable format, or a regular expression, numeric range, floating point pattern, etc. It is noted that the use of an extensible JSON based rule format in one or more embodiments provides for the information to be anything that may uniquely identify that value. Continuing with the $500 total amount token, the rule associated with that token may indicate the data element value is in a currency format.

After the one or more rules are generated by the rules generator 428, each rule may be associated with at least one template 422. The one or more rules associated with a particular template 422 form the rule map 424 for that template 422. The rule map 424 may be stored in the data store 710, for example, or any other suitable storage. As noted above, the template 422 includes the location map 420 and the rules map 424. As such, in one or more embodiments, when the rule map 424 is formed for the particular template, the template is generated and may be assigned a Template identifier 428. It is noted that after the rule map 424 is built, the actual data values used to generate the rules map may be deleted.

Continuing with the example where the invoice amount is $500, after the template 422 is generated, the $500 may be deleted, and the template includes the Template identifier 428, the location map 424 indicating the pixel location (X,Y) of the data-entry field 605 for "Invoice Amount" and the rule map 424 including the rule that states "Extract the data value from the pixel location (X,Y), and return to the invoice system for the invoice system to insert the data value to the location (A,B) of the invoice for "Invoice Amount."

In one or more embodiments, the rules of the rule map 424 may be stored in JSON, or any other suitable format. As described above, the inventors note that JSON is a very extensible model, as a rule may be a Regular Expression, Numeric Range, Floating point pattern etc. The JSON based rule format may be extended to any rule/pattern which uniquely identifies a value. The number of rule definitions may be extended based on the incoming invoices and ground truth.

It is noted that the rule building module 412 may use at least one of one or more "smart" mapping processes to map the ground truth values 426 to the values in the received document. For example, a "smart" mapping process may include "date matches," where the mapping process matches any pattern of the incoming date on the received document 202 with the ground truth value 426. As a non-exhaustive example of the date match, the mapping process may recognize the date may be in one of several formats including MM/DD/YYYY or MM-DD-YYYY. As such, even though the ground truth date is in MM/DD/YYYY format, the mapping process may map the date to the pixel location on the received document with MM-DD-YYYY.

As another example, the "smart" mapping process may map the ground truth values 426 to the values in the received document based on spacing. Since the value extraction is based on a pixel location, for elements containing multiple words, there are at least two pixel locations for one element. For example, if InvoiceNumber is "Invoice 1234", then the system may correctly extract "Invoice" at position A and "1234" at position B and concatenate them to give one value for Invoice Number. The same logic may be applicable for any text field. As still another example, the "smart" mapping process may map a number ground truth value 426 to a number value in the received document irrespective of the decimal points. In one or more embodiments, ground truth values may be sent in the Invoice's locale format. For example, if it is a French Invoice, and the Invoice Amount in Invoice is mentioned as "1234,56", the ground truth will be sent as 1234,56 instead of a Dot as decimal separator, which may be used in an U.S. Invoice. This may also be added as part of the rule JSON and may be applied to the extraction of this token. Depending on the locale of the Ground truth for that Company, one or more embodiments may provide for the differentiation of the Decimal separator vs Thousand separator using built-in algorithms.

Turning back to the process 300, after the template 422 is generated in S316, the one or more rules in the rule map 424 may be applied to the received document 202. In one or more embodiments, the extraction module 416 may apply the rule map 424 in S318 to extract the data element values 510 ("extraction result") from the data entry fields 605 of the received document 202 in S320. In one or more embodiments, the extraction module 416 may apply each rule of the rule map 424 to each pixel location in the location map 420 generated for the received document 202 to determine if the rule is applicable to this location. In one or more embodiments, the rules may be stored in the rule map 424 in a sequential order, and may be applied to the received document 202 in the sequential order. The rules of the rule map 424 may be applied in any other suitable order. In one or more embodiments, if conflicting rules are included in the rule map 424, the extraction module 416 may apply the rule that has been used the most number of times in the past, for example. In one or more embodiments, the extraction module 416 may, similar to the rule building module 412, apply "smart" processes, whereby the extraction module 416 extract any pattern of the incoming date (e.g., MM/DD/YYY, MM-DD-YYYY) on the received document 202, irrespective of the ground truth value format. In one or more embodiments, in addition to the extraction module 416 extracting data element values based on the rules, the extraction module 416 may also apply sentence matching and number matching, as described above with respect to how multiple words (sentence) are matched, and how decimal separators are used.

It is further noted that in one or more embodiments, each rule JSON for each and every token may be different, and the extraction module 416 may analyze the format of a specific rule and may apply an appropriate extraction strategy. For example, Invoice Date might have a rule like {Top: 100, Left: 200, Right: 500, Bottom: 600, Rule: [{Format: "MM/DD/YYYY"}]. Based on this rule, the strategy applied to extracting Invoice Date for this template will be different than for another template. Similarly, even for the same template, Invoice Date extraction may have a different rule than Invoice Number extraction.

After the data element values 510 have been extracted in S320, the extracted data element values may be returned in S322. In one or more embodiments, the extracted data element values may be returned to at least one of a graphical user interface for display to the user 204 or to another system for further processing. As a non-exhaustive example, the extracted data element values may be returned to the document capture application, which may then populate data entry fields 605 in a value-capture interface (e.g., invoice) 602 in the document processing system 206, and may display the created document 602 on a user interface 600. It is noted that typically the Invoice Capture application determines how to use the data returned. It may present the data to the user or it may bypass the Verification process altogether. The capture application may be a separate service that uses the extraction described in one or more embodiments. In one or more embodiments, the received document 202 may also be displayed.

When, in S314 it's determined the location map 420 does match a saved template 422, the process 200 proceeds to S324, and a stored template 422 is retrieved. The process 300 then proceeds to S318, and the rule map 424 associated with the saved template 422 is applied to the received document 202. The process 300 then continues from S318, as described above.

In one or more embodiments, the template 422 may be updated or changed by including a new rule in the rule map 424 for a particular template 422, for example. As a non-exhaustive example, the Big Company changes where the invoice total is on the document such that it is shifted from Location A to Location B. Therefore, the total may not be extracted form Location A because it may not exist anymore. This location change may be confirmed by receiving a new ground truth as part of the new rule generation. The new updated rule instructs the extraction module 416 to extract the invoice total from Location B. As such, by applying the rules to the received document in the sequential order, as described above, the extraction module 416 will apply a rule to extract the desired value (e.g., the extraction module may first try to extract a value from Location A, per the original rule, and then finding no value, may continue to try to apply the other rules in the rule map until it reaches the new rule, and the value from Location B is extracted). It is noted that an update threshold limit may be set by a system administrator or any other suitable party, whereby when a particular amount (i.e., update threshold limit) of data element values are not in a matched location, the template module 208 may treat the document as a new template. For example, if the update threshold limit is set at 15%, if Big Company changes the location of less than or equal to 15% of the data element values on the stored template, the template module 208 will treat the changes as new rules for the stored template. If, on the other hand, Big Company changes the location of more than 15% of the data element values, the template module 208 will treat the changes as having no match to a stored template, and a new template will be generated.

FIG. 7 is a block diagram of system architecture 700 according to some embodiments. Embodiments are not limited to architecture 700 or to a three-tier database architecture.

Architecture 700 includes database 710, database management system (DBMS) 720, application server 730, applications 735, clients 740, and a template module 208. Applications 735 may comprise server-side executable program code (e.g., compiled code, scripts, etc.) executing within application server 730 to receive queries from clients 740 and provide results to clients 740 based on data of database 710. A client 740 may access the template module 208 executing within application server 730, to extract data element values from a document for use in another application or system.

Application server 730 provides any suitable interfaces through which the clients 740 may communicate with the template module 208 or applications 735 executing on application server 730. For example, application server 730 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 735 executing on server 730 may communicate with DBMS 720 using database management interfaces such as, but not limited to, Open Database Connectivity (ODBC) and Java Database Connectivity (JDBC) interfaces. These types of applications 735 may use Structured Query Language (SQL) to manage and query data stored in database 710.

DBMS 720 serves requests to retrieve and/or modify data of database 710, and also performs administrative and management functions. Such functions may include snapshot and backup management, indexing, optimization, garbage collection, and/or any other database functions that are or become known. DBMS 720 may also provide application logic, such as database procedures and/or calculations, according to some embodiments. This application logic may comprise scripts, functional libraries and/or compiled program code.

Application server 730 may be separated from, or closely integrated with, DBMS 720. A closely-integrated application server 730 may enable execution of server applications 735 completely on the database platform, without the need for an additional application server. For example, according to some embodiments, application server 730 provides a comprehensive set of embedded services which provide end-to-end support for Web-based applications. The services may include a lightweight web server, configurable support for OData, server-side JavaScript execution and access to SQL and SQLScript.

Application server 730 may provide application services (e.g., via functional libraries) which applications 735 may use to manage and query the data of database 710. The application services can be used to expose the database data model, with its tables, hierarchies, views and database procedures, to clients. In addition to exposing the data model, application server 730 may host system services such as a search service.

Database 710 may store data used by at least one of: applications 735 and the template module 208. For example, database 710 may store the one or more templates 422, including the location maps 420 and rule maps 424 accessed by the application 735 during execution of the template module 208.

Database 710 may comprise any query-responsive data source or sources that are or become known, including but not limited to a structured-query language (SQL) relational database management system. Database 710 may comprise a relational database, a multi-dimensional database, an eXtendable Markup Language (XML) document, or any other data storage system storing structured and/or unstructured data. The data of database 710 may be distributed among several relational databases, dimensional databases, and/or other data sources. Embodiments are not limited to any number or types of data sources.

In some embodiments, the data of database 710 may comprise one or more of conventional tabular data, row-based data, column-based data, and object-based data. Moreover, the data may be indexed and/or selectively replicated in an index to allow fast searching and retrieval thereof. Database 710 may support multi-tenancy to separately support multiple unrelated clients by providing multiple logical database systems which are programmatically isolated from one another.

Database 710 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 740 may comprise one or more individuals or devices executing program code of a software application for presenting and/or generating user interfaces to allow data element value extraction and interaction with application server 730. Presentation of a user interface as described herein may comprise any degree or type of rendering, depending on the type of user interface code generated by application server 730.

For example, a client 740 may execute a Web Browser to request and receive a Web page (e.g., in HTML format) from a website application 735 of application server 730 via HTTP, HTTPS, and/or WebSocket, and may render and present the Web page according to known protocols. The client 740 may also or alternatively present user interfaces by executing a standalone executable file (e.g., an .exe file) or code (e.g., a JAVA applet) within a virtual machine.

Figure 8:
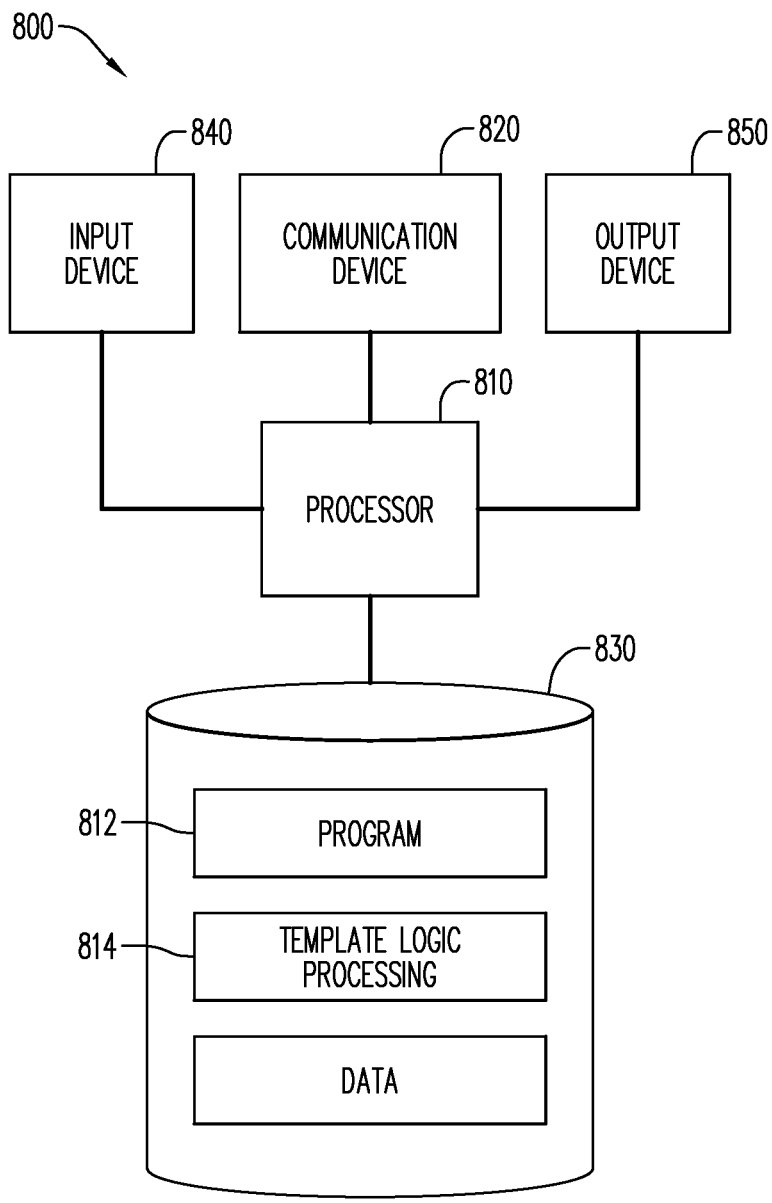
FIG. 8 is a block diagram of a system according to some embodiments.

FIG. 8 is a block diagram of apparatus 800 according to some embodiments. Apparatus 800 may comprise a general—or special-purpose computing apparatus and may execute program code to perform any of the functions described herein. Apparatus 800 may comprise an implementation of one or more elements of system 700. Apparatus 800 may include other unshown elements according to some embodiments.

Apparatus 800 includes template processor 810 operatively coupled to communication device 820, data storage device 830, one or more input devices 840, one or more output devices 850 and memory 860. Communication device 820 may facilitate communication with external devices, such as application server 730. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to manipulate graphical user interfaces and to input information into apparatus 800. Output device(s) 850 may comprise, for example, a display (e.g., a display screen) a speaker, and/or a printer.

Data storage device/memory 830 may comprise any device, including combinations of magnetic storage devices (e.g., magnetic tape, hard disk drives and flash memory), optical storage devices, Read Only Memory (ROM) devices, Random Access Memory (RAM) etc.

The storage device 830 stores a program 812 and/or template platform logic 814 for controlling the processor 810. The processor 810 performs instructions of the programs 812, 814, and thereby operates in accordance with any of the embodiments described herein, including but not limited to processes 200 and 300.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 700 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer-implemented method comprising:
receiving a document at a template module;
determining one or more pixel locations for one or more data entry fields in the received document, wherein each pixel location includes a row number and a column number;
for each determined pixel location for each data entry field, determining whether the determined pixel location matches a corresponding stored pixel location of a stored data entry field in a stored template;
determining whether the received document matches the stored template based on the one or more pixel locations that have been determined as matching, wherein the stored template defines a set of content positions irrespective of content values;
receiving one or more ground truth data element values when the received document does not match the stored template;
generating, after receipt of the one or more ground truth data element values, a first template when the received document does not match the stored template;
applying one or more rules associated with one of the stored template and the first template to the received document;
extracting one or more data elements from the received document based on the application of the one or more rules; and
returning the extracted one or more data elements.

2. The method of claim 1, wherein the extracted one or more data elements are extracted from the one or more data entry fields.

3. The method of claim 1, further comprising:
storing the one or more pixel locations for each data entry field in the received document when the received document does not match the stored template.

4. The method of claim 1, further comprising: generating the one or more rules based on the received one or more ground truth data element values prior to generating the first template when the received document does not match the stored template.

5. The method of claim 1, wherein the one or more pixel locations includes at least one of a top, left, bottom and right coordinate for the data entry field.

6. The method of claim 1, wherein determining the one or more pixel locations further comprises:
scanning the document to first determine a top left position of the data entry field.

7. The method of claim 1, further comprising:
receiving one or more second data elements, wherein the one or more second data elements are associated with the one or more data entry fields and wherein the one or more second data elements are received separate from the document.

8. The method of claim 7, further comprising:
updating the stored template by generating a new rule based on the one or more second data elements.

9. A system comprising:
a display;
a template module;
a memory storing processor-executable steps; and
a template processor in communication with the template module and operative to execute the processor-executable process steps to cause the system to:
receive a document at the template module;
determine one or more pixel locations for one or more data entry fields in the received document, wherein each pixel location includes a row number and a column number;
for each determined pixel location for each data entry field, determine whether the determined pixel location matches a corresponding stored pixel location of a stored data entry field in a stored template;
determine whether the received document matches the stored template based on the one or more pixel locations that have been determined as matching, wherein the stored template defines a set of content positions irrespective of content values;
receive one or more ground truth data element values when the received document does not match the stored template;
generate, after receipt of the one or more ground truth data element values, a first template when the received document does not match the stored template;
apply one or more rules associated with one of the stored template and the first template to the received document;
extract one or more data elements from the received document based on the application of the one or more rules; and
return the extracted one or more data elements.

10. The system of claim 9, wherein the extracted one or more data elements are extracted from the one or more data entry fields.

11. The system of claim 9, further comprising processor-executable process steps to cause the system to:
store the one or more pixel locations for each data entry field in the received document when the received document does not match the stored template.

12. The system of claim 9, further comprising processor-executable process steps to cause the system to: generate the one or more rules based on the received one or more ground truth data element values prior to generating the first template when the received document does not match the stored template.

13. The system of claim 9, further comprising processor-executable process steps to cause the system to:
receive one or more second data elements, wherein the one or more second data elements are associated with the one or more data entry fields and wherein the one or more second data elements are received separate from the document.

14. The system of claim 13, further comprising processor-executable process steps to cause the system to:
update the stored template by generating a new rule based on the one or more second data elements.

15. A non-transitory computer-readable medium storing program code, the program code executable by a computer system to cause the computer system to:
receive a document at a template module;
determine one or more pixel locations for one or more data entry fields in the received document, wherein each pixel location includes a row number and a column number;
for each determined pixel location for each data entry field, determine whether the determined pixel location matches a corresponding stored pixel location of a stored data entry field in a stored template;
determine whether the received document matches the stored template based on the one or more pixel locations that have been determined as matching, wherein the stored template defines a set of content positions irrespective of content values;
receive one or more ground truth data element values when the received document does not match the stored template;
generate, after receipt of the one or more ground truth data element values, a first template when the received document does not match the stored template;
apply one or more rules associated with one of the stored template and the first template to the received document;

extract one or more data elements from the received document based on the application of the one or more rules; and return the extracted one or more data elements.

16. The medium of claim 15, further comprising program code to cause the system to:

store the one or more pixel locations for each data entry field in the received document when the received document does not match the stored template.

17. The medium of claim 15, further comprising program code to cause the system to: generate the one or more rules based on the received one or more ground truth data element values prior to generating the first template when the received document does not match the stored template.

* * * * *